US008732474B1

(12) United States Patent
Perry et al.

(10) Patent No.: US 8,732,474 B1
(45) Date of Patent: *May 20, 2014

(54) SAFE INSTALLATION OF BROWSER EXTENSIONS

(75) Inventors: Matthew Perry, San Francisco, CA (US); Aaron Boodman, San Francisco, CA (US); Erik Kay, Belmont, CA (US); Antony John Sargent, Mountain View, CA (US)

(73) Assignee: Google Inc., Mountain View, CA (US)

( * ) Notice: Subject to any disclaimer, the term of this patent is extended or adjusted under 35 U.S.C. 154(b) by 311 days.

This patent is subject to a terminal disclaimer.

(21) Appl. No.: 13/110,895

(22) Filed: May 18, 2011

Related U.S. Application Data

(60) Provisional application No. 61/346,013, filed on May 18, 2010, provisional application No. 61/345,999, filed on May 18, 2010, provisional application No. 61/346,000, filed on May 18, 2010.

(51) Int. Cl.
*H04L 29/06* (2006.01)

(52) U.S. Cl.
USPC .............. 713/176; 713/156; 726/22; 726/23; 726/24; 726/25; 718/1

(58) Field of Classification Search
USPC ....................................................... 713/176
See application file for complete search history.

(56) References Cited

U.S. PATENT DOCUMENTS

| 5,974,549 | A | 10/1999 | Golan |
| 6,546,554 | B1 | 4/2003 | Schmidt et al. |
| 6,691,230 | B1 | 2/2004 | Bardon |
| 7,721,332 | B2 | 5/2010 | Stamper et al. |
| 7,975,308 | B1 | 7/2011 | Satish et al. |
| 8,176,321 | B1* | 5/2012 | Perry et al. ............ 713/167 |
| 8,448,244 | B1* | 5/2013 | Kukulski et al. ........ 726/22 |
| 2007/0136579 | A1 | 6/2007 | Levy et al. |
| 2007/0174915 | A1* | 7/2007 | Gribble et al. .......... 726/24 |
| 2008/0005472 | A1 | 1/2008 | Khalidi et al. |
| 2009/0210702 | A1* | 8/2009 | Welingkar et al. ...... 713/156 |
| 2009/0271707 | A1 | 10/2009 | Lin et al. |
| 2010/0205618 | A1 | 8/2010 | Gonzalez et al. |
| 2010/0235820 | A1* | 9/2010 | Khouzam et al. ....... 717/148 |
| 2011/0016382 | A1 | 1/2011 | Cahill et al. |
| 2011/0107311 | A1 | 5/2011 | Mcnulty et al. |
| 2011/0126190 | A1 | 5/2011 | Urbach |
| 2011/0138474 | A1 | 6/2011 | Yee et al. |
| 2011/0320818 | A1* | 12/2011 | Krishna et al. ........ 713/175 |

OTHER PUBLICATIONS

Moshchuk et al., "A Crawler-based Study of Spyware on the Web", 2006, pp. 1-17.*

(Continued)

*Primary Examiner* — Taghi Arani
*Assistant Examiner* — Thaddeus Plecha
(74) *Attorney, Agent, or Firm* — Brake Hughes Bellermann LLP

(57) ABSTRACT

Methods and apparatus for installing browser extensions are disclosed. An example method includes receiving a browser extension installation package in a main browser process, validating a digital signature of the installation package and launching a sandboxed sub-process of the browser application. The example method includes, in the sandboxed sub-process: respectively transcoding or recoding at least one of the plurality of constituent files, where the transcoded and/or recoded files replace their corresponding original constituent files. The example method includes, after the transcoding and/or recoding, passing the constituent files from the sandboxed sub-process to the main browser process and installing the browser extension to the browser application using the transcoded and/or recoded files.

19 Claims, 8 Drawing Sheets

(56) References Cited

OTHER PUBLICATIONS

Non-Final Office Action for U.S. Appl. No. 13/246,770, mailed Dec. 6, 2011, 13 pages.

Abiteboul, et al., "The Active XML Project: An Overview", The VLDB Journal, Jun. 1, 2007, 22 pages.

Dhawan, et al., "Analyzing Information Flow in JavaScript-based Browser Extensions", 2009 Annual Computer Security Applications Conference, pp. 382-391.

* cited by examiner

SAFE INSTALLATION OF BROWSER EXTENSIONS

CROSS REFERENCE TO RELATED APPLICATIONS

This application claims the benefit, under 35 U.S.C. §119, of U.S. Provisional Patent Application No. 61/345,999, U.S. Provisional Patent Application No. 61/346,000 and U.S. Provisional Patent Application No. 61/346,013, all filed May 18, 2010. The disclosures of these provisional patent applications are incorporated herein by reference in their entirety.

TECHNICAL FIELD

This application relates, in general, to installation of browser extensions.

BACKGROUND

Use of the World Wide Web continues to increase, as does the amount and variety of content that is available to its users. Users of the World Wide Web commonly use browsers (web browsers) implemented on a web-enabled computing device to access content. Such devices include personal computers, laptop computers, netbook computers, smartphones and cell phones, among a number of other possible devices. Such web browsers are configured to read programmatic code and render that code as web pages, which may include rendering both audio and visual content contained in various media files (e.g., image, video and audio files), as well as performing other functions defined in the programmatic code. Web pages are generally implemented using standard programming languages such as HTML, HTML5, CSS and JavaScript, among a number of other available programming languages.

Some browsers allow users to install add-ons (or extensions) to the browser, where such extensions add functionality to the browser and operate as an integrated part of the browser. For instance, an extension may provide a user access to its additional functionality by modifying a user-interface (UI) of the browser. As an example, a weather forecast extension may be added to a browser, where the extension provides easy access to weather information by adding an icon or a button to the UI of the browser. A user may then interact with the extension's button or icon (e.g., by clicking it or hovering over it with a pointing device) to obtain weather information, rather than having to browse to a weather related web page in order to obtain weather information.

Browser extensions are generally implemented using programmatic code that is written using the same programming languages that are used for implementing web pages. From a browser's perspective, extensions effectively function as web pages that are an integrated part of the browser once they are installed. By installing extensions that are of interest to him or her, a user can effectively create a custom browser that includes the functionality of the extensions they choose to install.

SUMMARY

In a general aspect, a computer-implemented method for installing a browser extension in a browser application includes receiving, in a main process of the browser application running on a computing system, a browser extension installation package for installation in the browser application. The browser extension installation package includes a header and a compressed, archived file. The compressed archived file contains a plurality of constituent files of the browser extension. The computer implanted further includes placing the browser extension installation package in a temporary directory and launching a sandboxed sub-process of the browser application. The sandboxed sub-process has access to the temporary directory. The computer-implemented method also includes, in the sandboxed sub-process: unpacking the compressed, archived file into the plurality of constituent files of the browser extension, and transcoding or recoding at least one of the plurality of constituent files, where the transcoded and recoded files replace their corresponding original constituent files. After the transcoding and/or recoding, the computer-implemented method also includes passing the constituent files back to the main browser process and, in the main process of the browser application, installing the browser extension to the browser application using the transcoded and recoded constituent files.

Example embodiments may include one or more of the following features. For instance, placing the browser extension installation package in a temporary directory may include creating and initializing, by the main browser process, a temporary file directory for use by the sandboxed process and copying the browser extension installation package to the temporary file directory. The sandboxed sub-process and the main process of the browser application may communicate via an inter-process communication (IPC) layer. The sandboxed sub-process may be restricted to accessing only resources of the computing system that are allocated to it by the main browser process. The transcoded and recoded constituent files may be passed back to the main browser process via the IPC layer.

The computer-implemented method may include, prior to launching the sandboxed sub-process: extracting a public key from the header; and validating (verifying) a digital signature of the compressed, archived file using the public key. If validation of the digital signature is successful, installation of the browser extension may continue. If validation of the digital signature is unsuccessful, installation of the browser extension may be canceled.

Unpacking the compressed, archived file into the plurality of constituent files of the browser extension may include determining whether unpacking of the compressed, archived file completed successfully. If unpacking of the compressed, archived file completed successfully, installation of the browser extension may continue. If unpacking of the compressed, archived file did not complete successfully, installation of the browser extension may be canceled.

The computer-implemented method may include, subsequent to unpacking the compressed, archived file, validating the header of the browser extension installation package. If validation of the header completes properly, installation of the browser extension may continue. If validation of the header does not complete properly, installation of the browser extension may be canceled. Validating the header may include: verifying that a size of the header matches an expected header size; verifying that the header includes a properly located browser extension installation package identifying code; verifying that the header includes a properly formed and properly located version field; verifying that a size of a public key included in the browser extension installation package matches an expected public key size; verifying that a size of a digital signature of the browser extension installation package matches an expected digital signature size; and/or verifying that a format of the public key matches an expected public key format.

The computer-implemented method may include, subsequent to unpacking the compressed, archived file, verifying a digital signature of the unpacked browser extension installation package. If verification of the digital signature is successful, installation of the browser extension may continue. If verification of the digital signature is unsuccessful, installation of the browser extension may be canceled. Verifying the digital signature may include: extracting a public key from the browser extension installation package; decrypting the digital signature using the public key; generating a message digest of the unpacked browser extension installation package; and/or comparing the generated message digest with the decrypted digital signature.

Transcoding or recoding the plurality of constituent files may include, for an image file of the browser extension installation package, decoding the image file using an image encoder/decoder included in the browser application and re-encoding the image file to a bitmap format using the image encoder/decoder included in the browser application. If decoding the image file completes successfully, installation of the browser extension may continue. If decoding the image file is unsuccessful, installation of the browser extension may be canceled.

Transcoding or recoding the plurality of constituent files may include, for one or more JavaScript Object Notation (JSON) objects of the browser extension installation package, parsing the one or more JSON objects using a JSON parser included in the browser application and serializing the one or more parsed JSON objects for communication over an IPC layer. If parsing of the one or more JSON objects is successful, installation of the browser extension may continue. If parsing of the one or more JSON objects is unsuccessful, installation of the browser extension may be canceled.

The one or more JSON objects may include a manifest file. The manifest file may include a plurality of fields containing defining information for the browser extension. The one or more JSON objects may include a catalog file, the catalog file including a plurality of key-value pairs, the key-value pairs being configured to provide for internationalization of the browser extension.

In another general aspect, a recordable storage medium has recorded and stored thereon instructions for installing a browser extension in a browser application, the instructions, when executed by a computing device, cause the computing device to receive, in a main process of the browser application, a browser extension installation package for installation in the browser application, where the browser extension installation package includes a header and a compressed, archived file. The instructions, when executed, further cause the computing device to place the browser extension installation package in a temporary directory and launch a sandboxed sub-process of the browser application, where the sandboxed sub-process has access to the temporary directory. The instructions, when executed, further cause the computing device to, in the sandboxed sub-process: unpack the compressed, archived file into a plurality of constituent files of the browser extension and transcode or recode at least one of the plurality of constituent files, where the transcoded and recoded files replace their corresponding original constituent files. The instructions, when executed, further cause the computing device to, after the transcoding and/or recoding, pass the constituent files back to the main browser process and, in the main process of the browser application, install the browser extension to the browser application using the constituent files passed back from the sandboxed sub-process. The recordable storage medium may implement one or more the features discussed above with respect to the computer-implemented method general aspect.

In another general aspect, an apparatus includes a processor and a non-transitory recordable storage medium having instructions for installing a browser extension in a browser application recorded thereon. The apparatus is configured, as result of executing the instructions, to receive, in a main process of the browser application, a browser extension installation package for installation in the browser application, where the browser extension installation package includes a header and a compressed, archived file. The apparatus is also configured, as result of executing the instructions, to place the browser extension installation package in a temporary directory and launch a sandboxed sub-process of the browser application, where the sandboxed sub-process has access to the temporary directory. The apparatus is further configured, as a result of executing the instructions, to, in the sandboxed sub-process, unpack the compressed, archived file into a plurality of constituent files of the browser extension, and transcode or recode at least one of the plurality of constituent files, where the transcoded and recoded files replace their corresponding original constituent files. The apparatus is still further configured, as result of executing the instructions, to, after the transcoding and/or recoding, pass the constituent files back to the main browser process and. in the main process of the browser application, install the browser extension to the browser application using the constituent files passed back from the sandboxed sub-process. The apparatus may implement one or more the features discussed above with respect to the computer-implemented method general aspect.

The details of one or more implementations are set forth in the accompanying drawings and the description below. Other features will be apparent from the description and drawings, and from the claims.

A system and/or method for web-based applications, substantially as shown in and/or described in connection with at least one of the figures, as set forth more completely in the claims.

BRIEF DESCRIPTION OF THE DRAWINGS

Like reference symbols in the various drawings indicate like elements.

DETAILED DESCRIPTION

Figure 1:
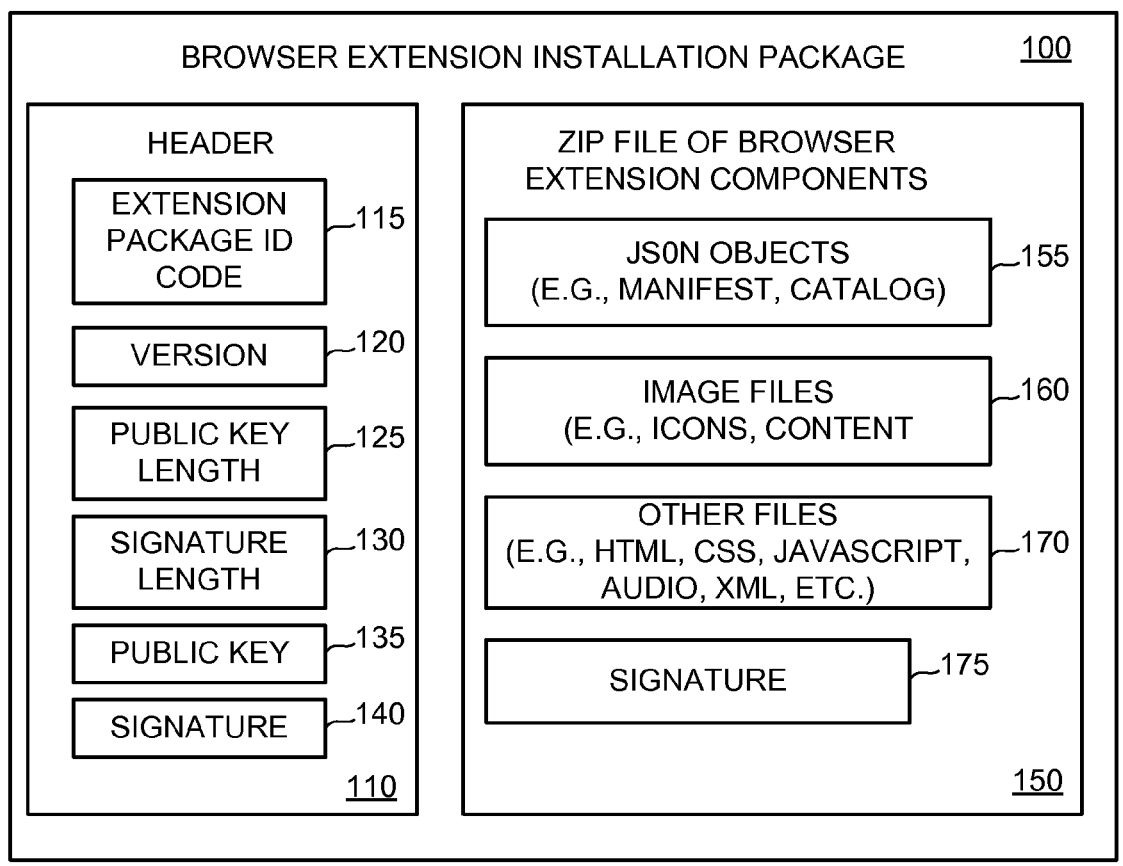
FIG. 1 is a block diagram of a browser extension installation package in accordance with an example embodiment.

This document describes systems and techniques that relate to installation of an extension in a browser application using a sub-process of a main process of the browser application. Throughout this document, the terms browser application, web browser and web browser application may be used interchangeably to refer to the same thing. A browser application may be an application configured to run on a computing system and render web content, such as web pages, web-based application and browser extensions, as some examples. In an example embodiment, the browser sub-process noted above runs separately from other sub-processes of the browser, such as tabs, web-based applications and previously installed browser extensions.

As is described herein, the browser sub-process that is used during installation of a browser extension may operate as a sandboxed sub-process. As the term is used herein, a sandboxed process is an unprivileged process that is isolated from a main, privileged (e.g., is able to access system resources) browser process, as well as an underlying operating system of a computing device on which the browser application is implemented. Such sandboxing may be accomplished by limiting, or preventing access to the resources of the browser application and/or resources of the underlying operating system (e.g., persistent memory, system calls, etc.) by the sandboxed sub-process.

Throughout this document, the terms extension and browser extension may be used interchangeably to refer to the same thing. In one example, a browser extension may be delivered to a computing device for installation as an installation package that includes a zipped bundle of files (e.g., compressed, archive file) and a header that includes some metadata about the extension. A properly formed extension, when unpacked and installed in the browser, adds functionality to the browser application. Extension applications may operate as webpages and may use all of the application programming interfaces (APIs) that the browser application provides to webpages, such as when they are executed as part of the trusted browser process or in a trusted sub-process. The types of data files of an extension application included in a zipped file bundle of an extension installation package may include hypertext mark-up language (HTML), cascading style sheets (CSS), JavaScript, images, and other types of files and web-related computer languages and code, such as JavaScript Object Notation (JSON) objects.

As discussed above, some of the types of data files used in browser extensions (e.g., image files and JSON objects) may be used as a vehicle for malicious acts, such as placing persistent malware (malicious software) on a user's computing system when an installation package for the browser package is unpacked, for example. In other instances, if poorly formed data files are included in a browser extension installation package, those poorly formed files may cause functionality problems in an associated browser application and/or an underlying operating system of a computing device on which the browser application is implemented. Using the techniques described herein (e.g., using sandboxed sub-processes), such problems may be reduced, or eliminated.

FIG. 1 is a block diagram of a browser extension installation package 100 in accordance with an example embodiment. The browser extension installation package 100 may be used to install a corresponding browser extension in a browser application. The particular format and arrangement of the elements of the browser extension installation package 100 are given by way of example. It will be appreciated, however, that a number of other arrangements are possible.

In some instances, the browser extension installation package 100 will be well formed, while in other instances the browser extension installation package 100 may be poorly formed, and/or may contain corrupt or malicious content. The techniques described herein may be used to safely install browser extensions from well-formed browser extension installation packages 100, as well as safely attempt to install poorly-formed and/or malicious browser extension installation packages 100, while substantially reducing or eliminating the risks associated with installing such poorly-formed and/or malicious browser extension installation packages in a privileged browser process.

In this example, the browser extension installation package 100 includes a header 110. The header 110 may adhere to a fixed format that allows the header 110 to be readily validated, such as by a sandboxed browser sub-process, as described herein. In an example embodiment, validating the header 110 comprises, at least, validating that the header 110 is properly formed with respect to a standard header format. An example approach for performing such validation of the header 110 is discussed below with respect to FIG. 6.

As shown in FIG. 1, the header includes an extension package ID code 115 (which may be referred to as a "magic number"), a version number 120, a public key length 130, a digital signature length 130, a public key 135 and a signature 140. In an example, embodiment, extension package ID code 115 (magic number) may be a field that contains a constant value that indicates that the installation package 100 is (or purports to be) a browser extension installation package. In this example, the version 120 may be a field that species a file format version for the browser extension installation package 100.

In the header 110, the public key length 125 may be a field that specifies the length of the public key 135 (e.g., in bytes) and the signature length 130 may be a field that specifies a length of the digital signature 140 (e.g., in bytes). The public key 135 may be a field that contains a Rivest, Shamir and Adleman (RSA) public key. In an example embodiment, the public key 135 may be an X509 SubjectPublicKeyInfo block that corresponds with the extension developer's private encryption key. In this example, the digital signature 140 may be a digital signature of the compressed, archived zip file 150 that is included in the browser extension installation package 100. In one embodiment, the digital signature 140 may be generated by producing a hash of the zip file 150 (e.g., using a secure hash algorithm (SHA), such as SHA-1) and then encrypting the hash using the browser extension developer's private key that corresponds with the public key 135.

As shown in FIG. 1, the zip file 150 of the browser extension installation package 100 includes JSON objects 155, image files 160, other files 170 and another digital signature 175. In an example embodiment, the JSON objects 155 may include a manifest data file and a catalog data file. In this example, the manifest file may be a JSON-formatted file that includes a plurality of information fields that are used to define the corresponding extension, such as a name field and a version field. The manifest file may also include fields that define the types of actions the extension will take in the browser, such as displaying icons, for example. The manifest file may also be used to specify a number of other optional attributes of an extension, including specifying a second public key, which may be used to verify the unpacked contents of the zip file 150 or, alternatively, may be used to verify other portions of the extension. The catalog file, in this example, is a JSON-formatted file that includes a plurality of key-value pairs that may be used for internationalization of the browser extension included in the browser extension installation package 100.

In an example embodiment, the image files 160 may include icons, as well as images files that are used by the extension when it is rendered in the browser. The image files may be in a number of formats, such as ICO, GIF, JPG and PNG, among a number of other possible formats. As indicated in FIG. 1, the other files 170 of the zip file 150 may include HTML files, CSS files, JavaScript files, audio files, and/or XML files among other types of files that an extension may need. XML files may also be provided to a computing device in response to auto-update requests that are made by an extension that is already installed. Such XML files may be transcoded and/or recoded in similar fashion as a browser extension installation package, such as using the techniques described herein.

The digital signature 175, in this example, may be a digital signature of the unpacked zip file 150 of the browser extension installation package 100. For instance, the digital signature 175 may be generated using similar techniques as were described above with respect to the digital signature 140. Further, a method for verifying the digital signature 175 is described below with respect to FIG. 7.

Figure 2:
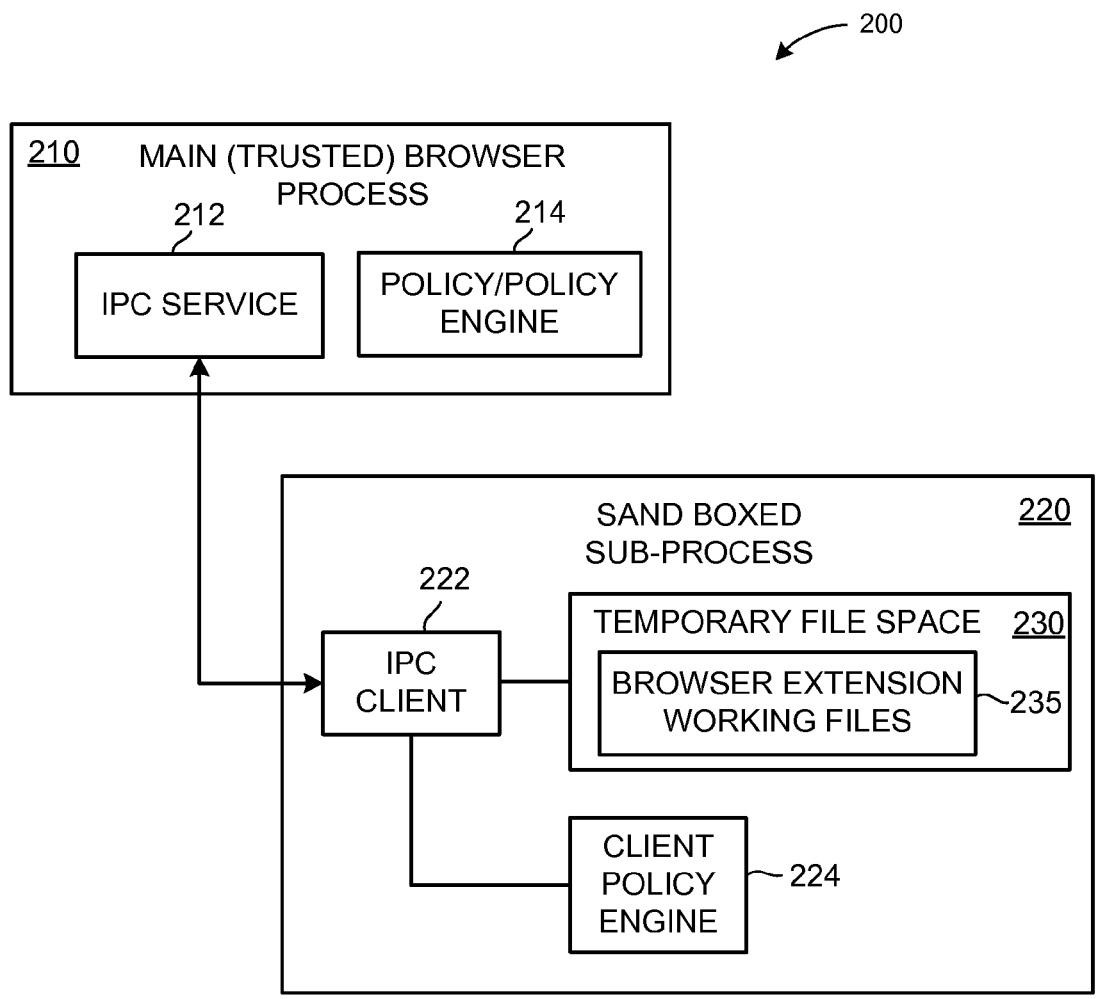
FIG. 2 is a block diagram illustrating a browser application in accordance with an example embodiment.

FIG. 2 is a block diagram illustrating a multi-process architecture of a browser application 200 in accordance with an example embodiment. As shown in FIG. 2, the browser application 200 may include (implement) a main (trusted or privileged) browser process that has relatively unrestricted access to resources of a computing system on which the browser application 200 is running. The browser application 200 may also include (implement) a sandboxed browser process 220 that may be used, such as by using the techniques described herein, to safely install browser extensions.

In this example, the sandboxed sub-process 220 is an unprivileged process, which runs as a separate thread from the main browser process 210. The sandboxed sub-process 220 is restricted from accessing resources of the computing system on which it running, with the exception of resources that are allocated to the sandboxed sub-process 220 by the main browser process 210. These resources restrictions and allocations may be enforced in accordance with a policy by the policy/policy engine 214 of the main browser process 210 and the client policy engine 224 of the sandboxed sub-process 220.

As shown in FIG. 2, the main browser process 210 may include an inter-process communication (IPC) service 212 and the sandboxed sub-process 220 may include an IPC client 222. The sandboxed sub-process 220 may communicate with the main browser process 210 via its IPC client 222, an IPC layer 215 and the IPC service 212 of the main browser process 210. Using the IPC layer 215, the sandboxed sub-process 220 can request resources from the main browser process, such as services that are performed by the browser, including those described herein, such as below with respect to FIG. 3, for example.

As is also shown in FIG. 2, the sandboxed sub-process 220 may have access to a temporary file space 230, within which it may access and write browser extension temporary files 235 during sandboxed operations related to installing browser extensions, such as those described herein. The temporary file space 230 is a system resource (e.g., a dedicated area of a file system) that is allocated, by the main browser process 210, to the sandboxed sub-process 220. In one example embodiment (such as in the method 400), the main browser process 210 may define the temporary file space 230 by initializing a directory path that is to be used by the sandboxed sub-process 220. Once the temporary file space 230 is initialized, the main browser process 210 may then launch the sandboxed sub-process 220 "around" the temporary file space 230.

Figure 3:
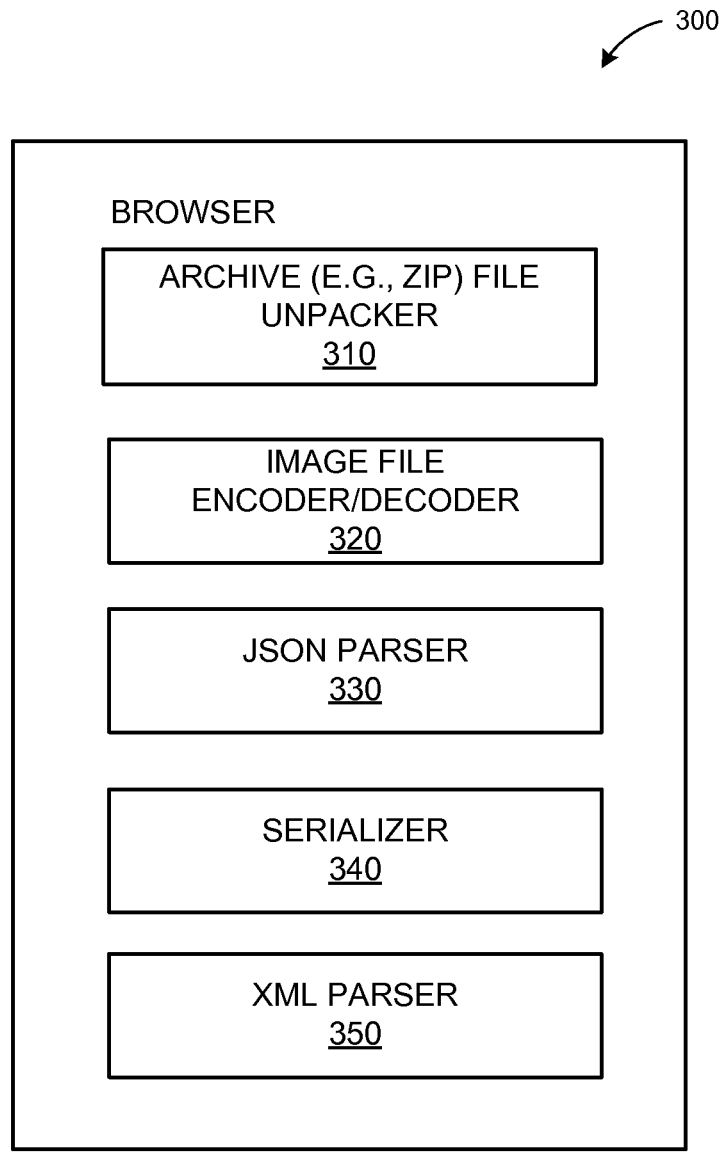
FIG. 3 is a block diagram illustrating another browser application in accordance with an example embodiment.

FIG. 3 is a block diagram illustrating another browser application 300 in accordance with an example embodiment. For purpose of illustration, the browser 300 will be described with reference to the elements of the browser extension installation package 100 shown in FIG. 1, as well as the multi-process browser 200 shown in FIG. 2. It will be appreciated, however, that the browser 300 may operate in like fashion as the browser 200 and also may be used in conjunction with a number of other installation package configurations.

As shown in FIG. 3, the browser 300 includes an archive (e.g., zip) file unpacker 310, which may be used to unpack the compressed, archive file 150 of the browser extension installation package 100 that includes the constituent elements (data files) of the browser extension installation package 100. The browser 300 also includes an image decoder/encoder 320, which may be used to transcode and/or recode the image files 160. The browser 300 further includes a JSON parser 330, a serializer 340 and an XML parser 350. The JSON parser 155 may be used to parse any JSON objects 155 included in the compressed archive file 150, such as a manifest and/or a catalog, as are described herein. The serializer 340 may then be used to serialize the parsed JSON objects for transmission over an IPC layer between a main (privileged) browser process and a sandboxed sub-process. The XML parser 350 may be used to parse XML files, such as may be used to implement auto-updates to installed extensions, e.g., after being provided in response to an auto-update request generated by an installed extension. In an example embodiment, the serializer may also be configured to serialize such parsed XML files, which can then be passed to a main browser process from a sandboxed sub-process using an IPC layer, such as described herein.

FIGS. 4-9 illustrate various methods (respectively 400, 500, 600, 700, 800 and 900) that may be used for installing browser extensions using sandboxed sub-processes of a privileged main browser process. In example embodiments, the methods 400-900 may be combined in a number of appropriates manners, some of which are discussed herein, though other appropriate combinations are possible. In other example embodiments, the operations of the methods 400-900 may be performed in different orders than those shown, individual operations of one method may be combined with the operations of other methods, individual operations of a given method may be omitted and/or other operations may be added to a given method. Further, the methods 400-900 may be implemented using the techniques described above with respect to FIGS. 1-3. Accordingly, for purposes of illustration, the methods 400-900 will be described with further reference to FIGS. 1-3, as appropriate.

Figure 4:
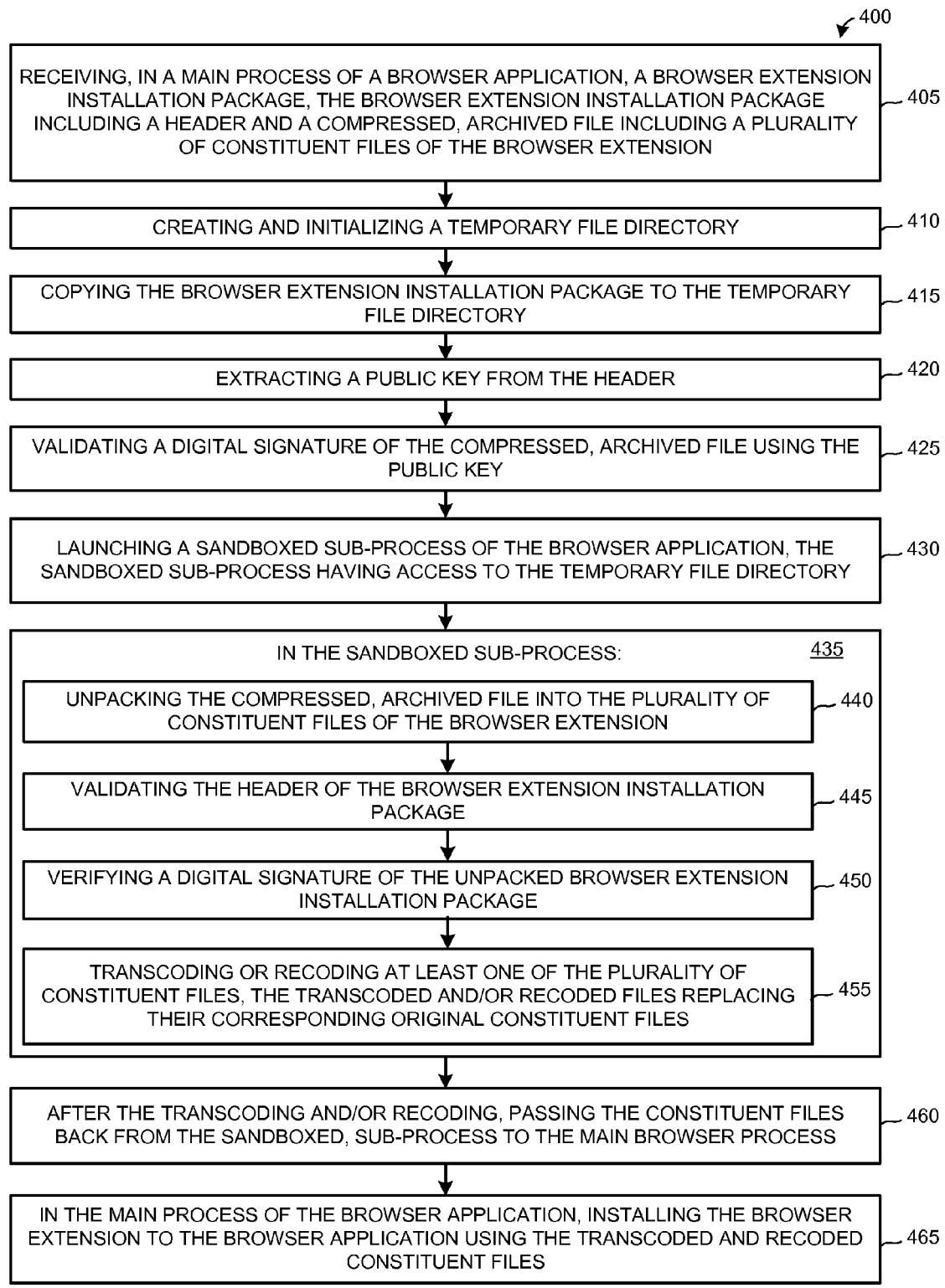
FIG. 4 is a flowchart illustrating a method for installing a browser extension in accordance with an example embodiment.

FIG. 4 is a flowchart illustrating a method 400 for installing a browser extension using a sandboxed sub-process in accordance with an example embodiment. For purposes of illustration, the below description of the method 400 will be described by referencing elements of FIGS. 1-3. These references are given by way of example. However, it will be appreciated that approaches and elements other than those referenced herein may be used when implementing the method 400. As is discussed in further detail below with the respect to FIG. 5, the method 400 includes a number of verification operations (e.g., at blocks 425, 440, 445, 450 and 455). In an example embodiment, such as discussed with respect to the method 500, if any of those verification operations is not successful and/or fails to complete, installation of a corresponding browser extension may be aborted. For purposes of brevity, the result of aborting installation of a browser extension in the event of unsuccessful completion or failure of any of the verification operations will not be separately discussed wither respect to each of the verification operations of the method 400. Instead, such an approach is discussed in detail below with respect to FIG. 5.

At block 410, the method 400 includes receiving, in a main process 210 of a browser application 200 running on a computing system, a browser extension installation package 100, for installation in the browser application 200. The computing device may be, for example, one of the computing devices illustrated in FIG. 10. In the example method 400, the browser extension installation package 100 may include a header 110 and a compressed, archived file 150, the compressed archived file 150 containing a plurality of constituent files of the browser extension, such as the JSON objects 155, the image files 160 and the other files 170, as illustrated in FIG. 1.

At block 410, the method 400 includes creating a temporary file directory, which may also be referred to as designating temporary file storage space 230 in the corresponding computing system's file system. In the method 400, the temporary file directory/file space 230 is accessible to the sandboxed sub-process 220. At block 415, the method 400 includes copying (or placing) the browser extension installation package 100 to (in) the temporary file directory/file space 230.

The method 400 then moves to block 420, where the method 400 includes extracting a public key 135 from the header 110. The method 400 then includes, at block 425, validating a digital signature 140 of the compressed, archived file using the public key 135. At block 430, the method 400 includes launching the sandboxed sub-process 220 of the browser application, where the sandboxed sub-process has access to the temporary directory/file space 230, as discussed above.

At block 435, the method 400 includes, in the sandboxed sub-process 220, at block 440, unpacking the compressed, archived file 150 into the plurality of constituent files 155, 160 and 170 of the browser extension, which may be accomplished using the archive file unpacker 310 of the browser 300, where the constituent files 155, 160 and 170 are placed in the browser extension working files 235 (in the sandboxed process 220).

At block 445, the method 400 includes validating the header 115 of the browser extension installation package 100. An example approach for validating the header 115 is discussed below with respect to FIG. 6.

At block 450, the method 400 includes verifying the digital signature 175 of the unpacked browser extension installation package, which both may be included in the browser extension working files 235 of FIG. 2. An example approach for verifying the digital signature 175 is discussed below with respect to FIG. 7.

At block 455, the method includes transcoding or recoding at least one of the plurality of constituent files 155, 160 and 170, where the transcoded and recoded files replace their corresponding original constituent files. As with the original constituent files, the replacements are placed in the browser extension working files 235, or within the temporary file space 230 of the sandboxed sub-process 220. Example methods for transcoding and/or recoding are discussed below with respect to FIGS. 8 and 9.

For purposes of this disclosure, transcoding is the process of decoding a file of a first format and then re-coding the decoded file to another format. In contrast, recoding is decoding an encoded file and then recoding the decoded file in the same format as the original file. Transcoding and recoding certain files that may be included with a browser extension installation package may help avoid unwanted effects that could result from such files, such as those discussed herein (e.g., data overruns, interference with other process, malicious act, etc.). Such effects may be avoid, because transcoding and recoding those files using known browser elements, such as the image file decoder/encoder 320, the JSON parser 330 and the serializer 340 may eliminate, at least some of, any unwanted artifacts that are present in such data files.

The method 400 further includes, at block 460, after the transcoding and/or recoding, passing the constituent files (including any files that were replaced at block 460) back to the main browser process 210 from the sandboxed sub-process 220, e.g., from the browser extension working files 235. At block 465, the method 400 includes, in the main process 210 of the browser application 200, installing the browser extension to the browser application 200 using the transcoded and recoded constituent files and any files of the extension that were not transcoded or recoded. In an example, embodiment, the transcoded and/or recoded files may be passed back to the main browser process 210 using the IPC layer 215, while files of the browser extension that were unpacked into the browser extension working files 235 but not transcoded or recoded, may simply be copied by main browser process 210 from the temporary file space 230 for use by the main browser process 210 in installing the browser extension of the browser extension installation package 100.

Figure 5:
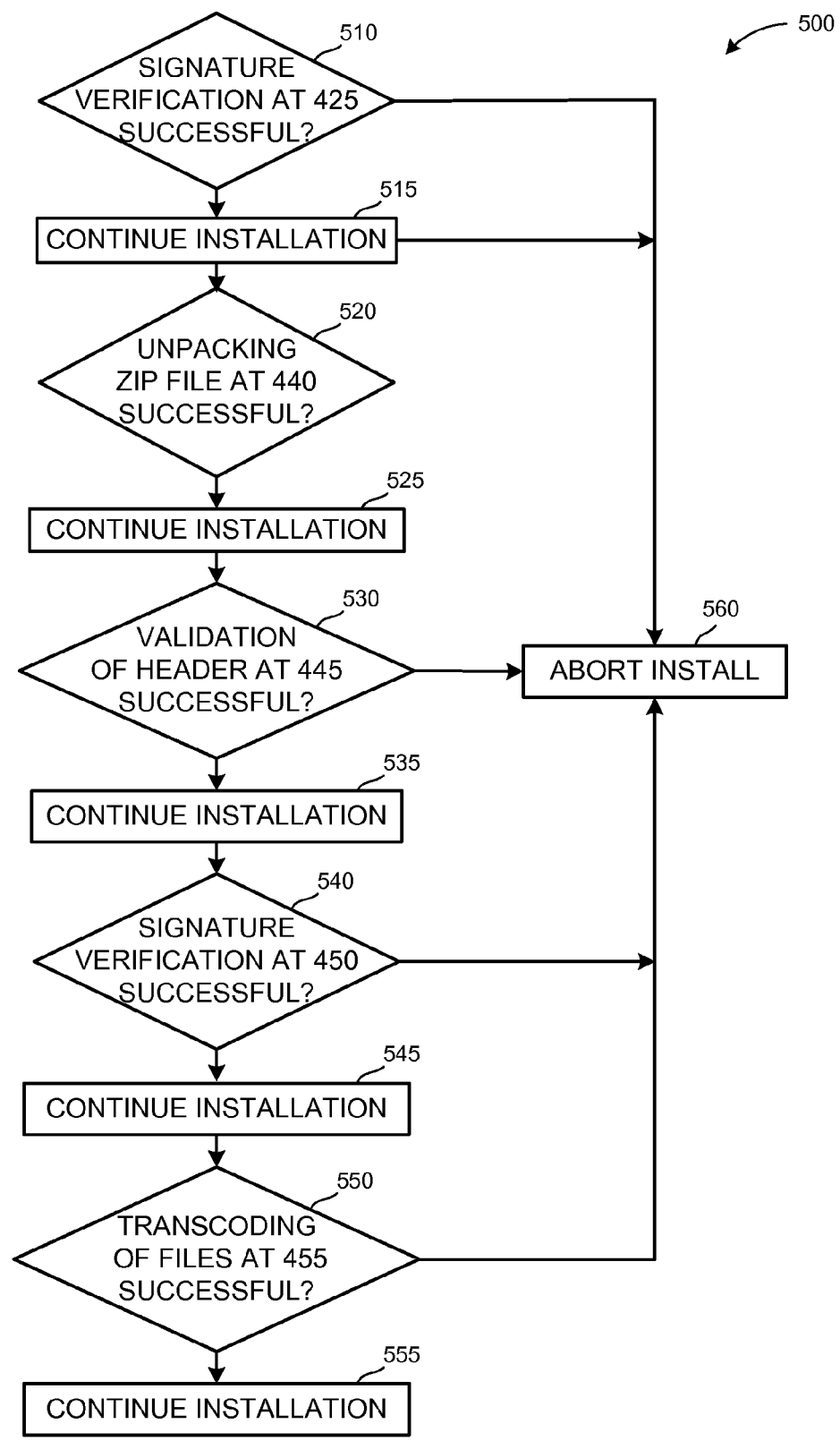
FIG. 5 is a flowchart illustrating a validation flow in accordance with an example embodiment that corresponds with the method of FIG. 4.

FIG. 5 is a flowchart illustrating a validation flow 500 in accordance with an example embodiment that corresponds with the method of FIG. 4. The validation flow 500 illustrates various decision points that correspond with verification and validation operations of the method 400 shown in FIG. 4. As illustrated in FIG. 5 with reference to FIG. 4, by incorporating the validation flow 500 in conjunction with the method 400, installation of a browser extension, using the method 400, will be aborted at 560 if verification or validation is not successful at those corresponding steps of the method 400. The decision operation blocks of the validation flow 500 clearly reference their corresponding operations in the method 400.

The validation flow 500, at block 510, includes determining whether the digital signature verification at block 425 of the method 400 is successful. If the digital signature is successfully verified at block 510 (block 425), the method 500 continues installation of the corresponding browser extension at block 515 (block 430 in FIG. 4). The validation flow 500 then includes, at block 520, determining whether unpacking of a compressed, archive file of a browser extension installation package at block 440 is successful. If the unpacking is successfully completed, the method 500 continues installation of the corresponding browser extension at block 525 (block 445 in FIG. 4).

At block 530, the method 500 includes determining whether the validation of a header of a browser extension installation package at block 445 (which may be implemented using the method 600) is successful. If the validation is successful, the method 500 continues installation of the corresponding browser extension at block 535 (block 450 in FIG. 4). The validation flow 500 then includes, at block 540, determining whether the digital signature verification at block 450 (which may be implemented using the method 700) is successful. If the digital signature is successfully verified at block 540 (block 450), the method 500 continues installation of the corresponding browser extension at block 545 (block 455 in FIG. 4).

The validation flow 500 then includes, at block 550, determining whether transcoding/recoding of files of the unpacked browser extension installation package at block 455 (which may be implemented using the methods 800 and 900) is successful. If the transcoding/recoding is successful, the method 500 continues installation of the corresponding browser extension at block 555 (block 460 in FIG. 4).

Figure 6:
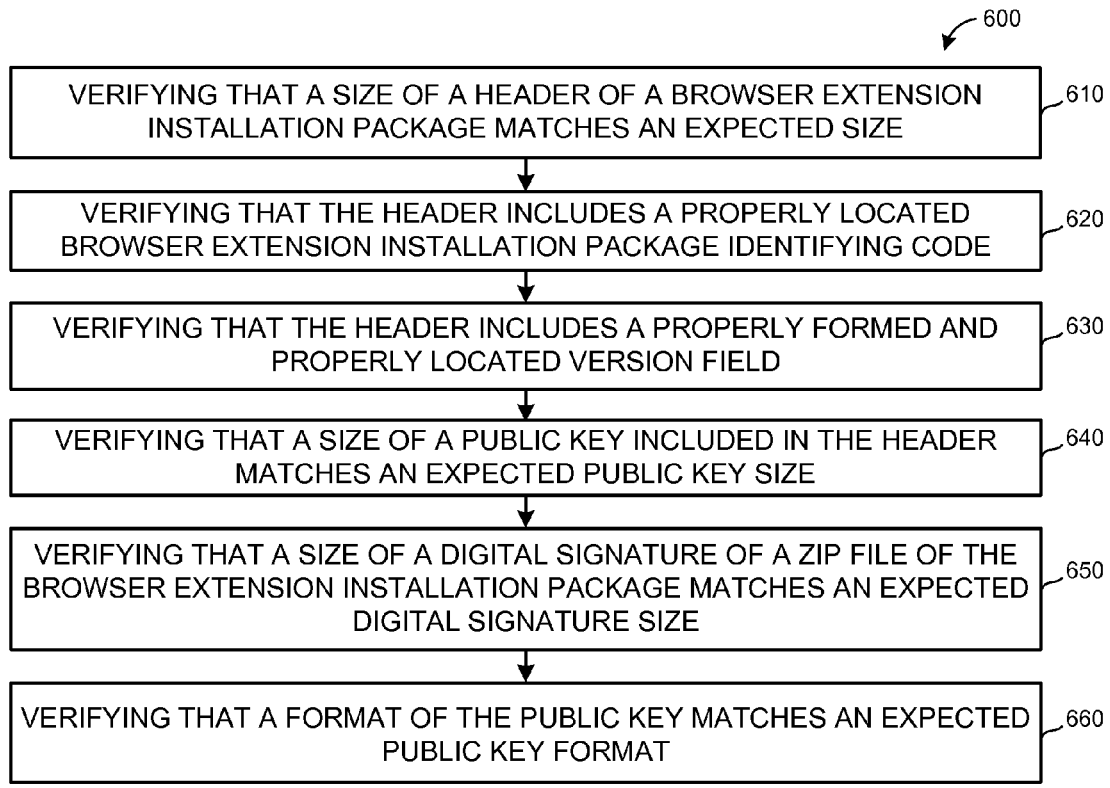
FIG. 6 is a flowchart illustrating a method for verifying a browser extension installation package header in accordance with an example embodiment.

FIG. 6 is a flowchart illustrating a method for verifying a browser extension installation package header in accordance with an example embodiment. The method 600, in one example, may be one part of a validation process for a browser extension installation package, such as the operation that was discussed above with respect to block 530 in FIG. 5. Likewise, in an example embodiment, the method 600 may be used to implement the operation 445 of the method 400. In the example embodiment discussed with respect to FIG. 6, if any of the operations of the method 600 fail, verification of the header (e.g., at block 530 and block 445) fails and installation of a corresponding browser extension is aborted, such as at block 560. For purposes of brevity, the result of aborting installation in the event of unsuccessful completion will not be repeated for each operation of the method 600.

In one embodiment, implementing the method 600 may be done to verify whether a header of a browser extension installation package adheres to a uniform, fixed format, such as that of the header 110 discussed above. As shown in FIG. 6, the method 600 includes, at block 610, verifying that a size of the header matches an expected header size. In an example embodiment, the operation at block 610 may be accomplished by reading the header and counting the number of bytes read. If the number of bytes read matches an expected number of bytes, the header size is verified.

At block 620, the method 600 includes verifying that the header includes a properly located browser extension installation package identifying code, such as the extension package ID code 115 (magic number) discussed above with respect to the header 110. If the header does include a properly located extension ID code 115, the method 600 continues on to block 630, where the header is checked to verify whether it contains a properly formed and properly located version field. After checking the version field, if verified, the method 600 continues to block 640, which includes verifying that a size of a public key included in the browser extension installation package matches an expected public key size. At block 650, the method 600 includes verifying that a size of a digital signature of the browser extension installation package matches an expected digital signature size. At block 660, the method 600 includes verifying that a format of the public key matches an expected public key format.

Figure 7:
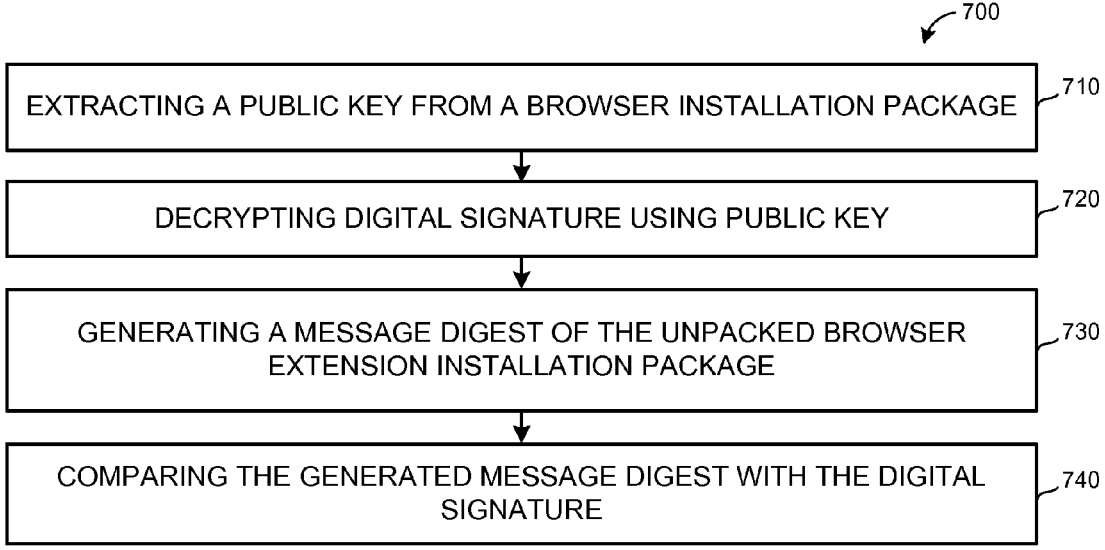
FIG. 7 is a flowchart illustrating a method for validating a digital signature of an unpacked browser extension installation package in accordance with an example embodiment.

FIG. 7 is a flowchart illustrating a method 700 for validating a digital signature of an unpacked browser extension installation package in accordance with an example embodiment. The method 700, in one example, may be one part of a validation process for a browser extension installation package, such as the operation that was discussed above with respect to block 540 in FIG. 5. Likewise, in an example embodiment, the method 700 may be used to implement the operation 450 of the method 400.

At block 710, the method includes extracting a public key from the browser extension installation package, such as extracting the public key 135 from the header 110 of the browser extension installation package 100. As was discussed above, the public key 135 of the header 110 may be included in an X509 SubjectPublicKeyInfo block. Of course, any appropriate public key (and corresponding private key) format may be used. In another example embodiment, the private key extracted at block 710 may be obtained from the unpacked, constituent files of the browser extension, such as described with respect to block 440 of FIG. 4, for example.

At block 720, the method 700 further includes decrypting a digital signature for the unpacked browser extension installation package using the extracted public key, where the digital signature may be included in the header or, alternatively, may be included unpacked with the browser files, such as at block 440 of the method 400. As discussed herein, in this example, the digital signature of block 720 may be generated using a private key that corresponds with the extracted public key, an RSA encryption algorithm and the SHA-1 hash function, though other approaches may be used.

At block 730, the method 700 includes generating a message digest of the unpacked browser extension installation package, which, in this example, may be done using the SHA-1 algorithm. The method 700 then includes, at block 740, comparing the message digest generated at block 730 with the decrypted digital signature generated at block 720. If there is a match at block 740, the digital signature of the unpacked browser extension package is verified. If there is not a match at block 740 this may indicate that the browser extension installation package 100 may have been corrupted and/or modified and the installation of a corresponding browser extension may be aborted, such as at block 540 and block 560 of the method 500.

Figure 8:
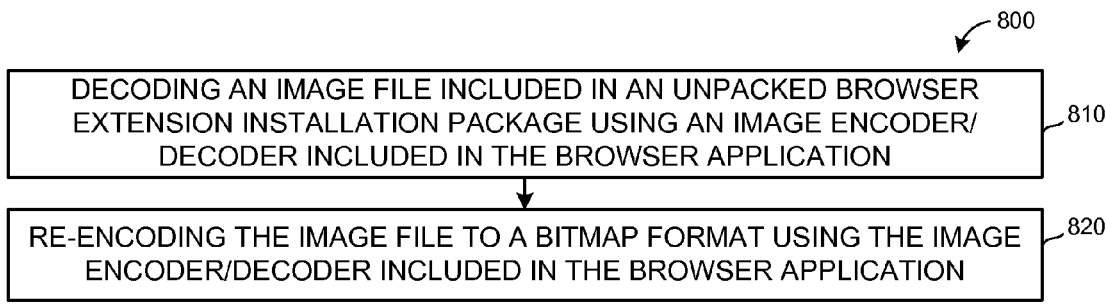
FIG. 8 is a flowchart illustrating a method for transcoding or recoding an image file in accordance with an example embodiment.

FIG. 8 is a flowchart illustrating a method 800 for transcoding or recoding an image file in accordance with an example embodiment. The method 800 may be implemented as part of the transcoding and recoding operation of block 455 shown in FIG. 4. As discussed above, the transcoding and/or recoding at block 455 (and at block 810 in this example) is performed in a sandboxed sub-process, such as the sandboxed sub-process 220 shown in FIG. 2. Of course, other approaches are possible.

As shown in FIG. 8, the method 800 includes, at block 810, decoding an image file using an image encoder/decoder that is included in a browser application, such as encoder/decoder 320 in the browser application 300. The operation at block 810, in one example, may be one part of a validation process for a browser extension installation package, such as the operation discussed above with respect to block 550 in FIG. 5. For instance, if the encoder/decoder 320 does not successfully decode an image file (or a data file purporting to be an image file) that has been unpacked from a browser extension installation package (e.g., the browser extension installation package 100), this may indicate that the offending data file is poorly formed, or could potentially contain malicious content.

If, as discussed above, the decoding operation of block 810, in this example, occurs in the sandboxed sub-process 220, any harmful effects that could result from attempting to decode a malicious or poorly formed image file (or purported image file) may be avoided. For example, as was discussed above with respect to block 550, if the decoding at block 810 fails to complete successfully, installation of a browser extension from an associated browser extension installation package may be halted, canceled and/or aborted, such as at block 550 and 560 of FIG. 5. In this situation, appropriate notifications may be made, such as by notifying a user that an error occurred during installation of the browser extension (e.g., via a dialog box). In an example embodiment, the error notification may include an assigned error code and/or a narrative description of the error.

Once the image file is successfully decoded at block 810, the method 800 includes, at block 820, re-encoding the image file in a bitmap format using the encoder/decoder 320 of the browser 300, for example. Re-encoding the image file to a bitmap format using a known encoder (the encoder/decoder 320) may provide additional assurance that the transcoded/recoded image file does not contain malicious content. This additional assurance may result from the fact that, because bitmap image formats are simple, linear data formats, even if the transcoded/recoded image file contains data that corresponds with malicious content in the original image file, using a bitmap format file that is generated by a known encoder makes it unlikely that that transcoded/recoded image file would manifest itself as any improper or malicious actions.

Figure 9:
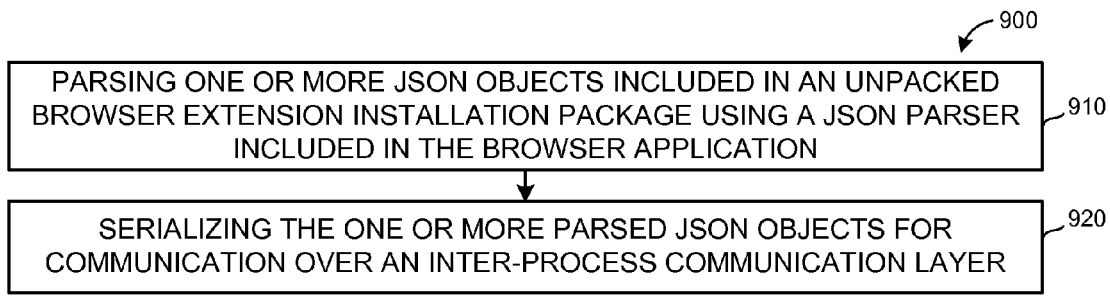
FIG. 9 is a flowchart illustrating a method for transcoding or recoding JSON objects in accordance with an example embodiment.

FIG. 9 is a flowchart illustrating a method 900 for transcoding or recoding JSON objects in accordance with an example embodiment. As with the method 800, the method 900 may be implemented as part of the transcoding and recoding operation of block 455 shown in FIG. 4. As discussed above, the transcoding and/or recoding at block 455 (and at block 910 in this example) is performed in a sandboxed sub-process, such as the sandboxed sub-process 220 shown in FIG. 2. Of course, other approaches are possible.

As shown in FIG. 9, the method 900 includes, at block 910, parsing (in the sandboxed sub-process 220) one or more JSON objects using a JSON parser that is included in the browser application, such as the JSON parser 330 in the browser application 300. The operation at block 910, in one example, may be one part of a validation process for a browser extension installation package, such as the operation that was discussed above with respect to block 550 in FIG. 5. For instance, if the JSON parser 330 does not successfully parse a JSON object (or a data file that purports to be a JSON object) that has been unpacked from a browser extension installation package (e.g., the browser extension installation package 100) this may indicate that the offending data file is poorly formed, or may potentially contain malicious content.

However, if the parsing operation of block 910 occurs in the sandboxed sub-process 220, any harmful effects that could result from attempting to parse a malicious or poorly formed JSON object may be avoided. For example, as was discussed above with respect to block 550, if the parsing at block 910 fails to complete successfully, installation of a browser extension from an associated browser extension installation package may be halted, canceled and/or aborted, such as at blocks 550 and 560 of FIG. 5. In this situation, appropriate notifications may be made, such as notifying a user that an error occurred during installation of the browser extension. In an example embodiment, the error notification may include an assigned error code and/or a narrative description of the error.

Once the one or more JSON objects are successfully parsed at block 910, the method 900 includes, at block 920, serializing the one or more parsed JSON objects for communication over an inter-process communication layer, such as the IPC layer 215 shown in FIG. 2. In an example embodiment, successful completion of the serialization performed at block 910, as well as successfully passing the serialized, parsed JSON objects from the sandboxed sub-process 220 to the main (privileged) browser process 210 over the IPC layer 215 (such as was discussed with respect to block 460 of the method 400) may provide further assurance that the JSON objects are well formed data files. Such further assurance may be due to the fact that the serializer 340 and the protocol of the IPC layer 215 have additional safeguards that may identify poorly formed and/or malicious data files.

Figure 10:
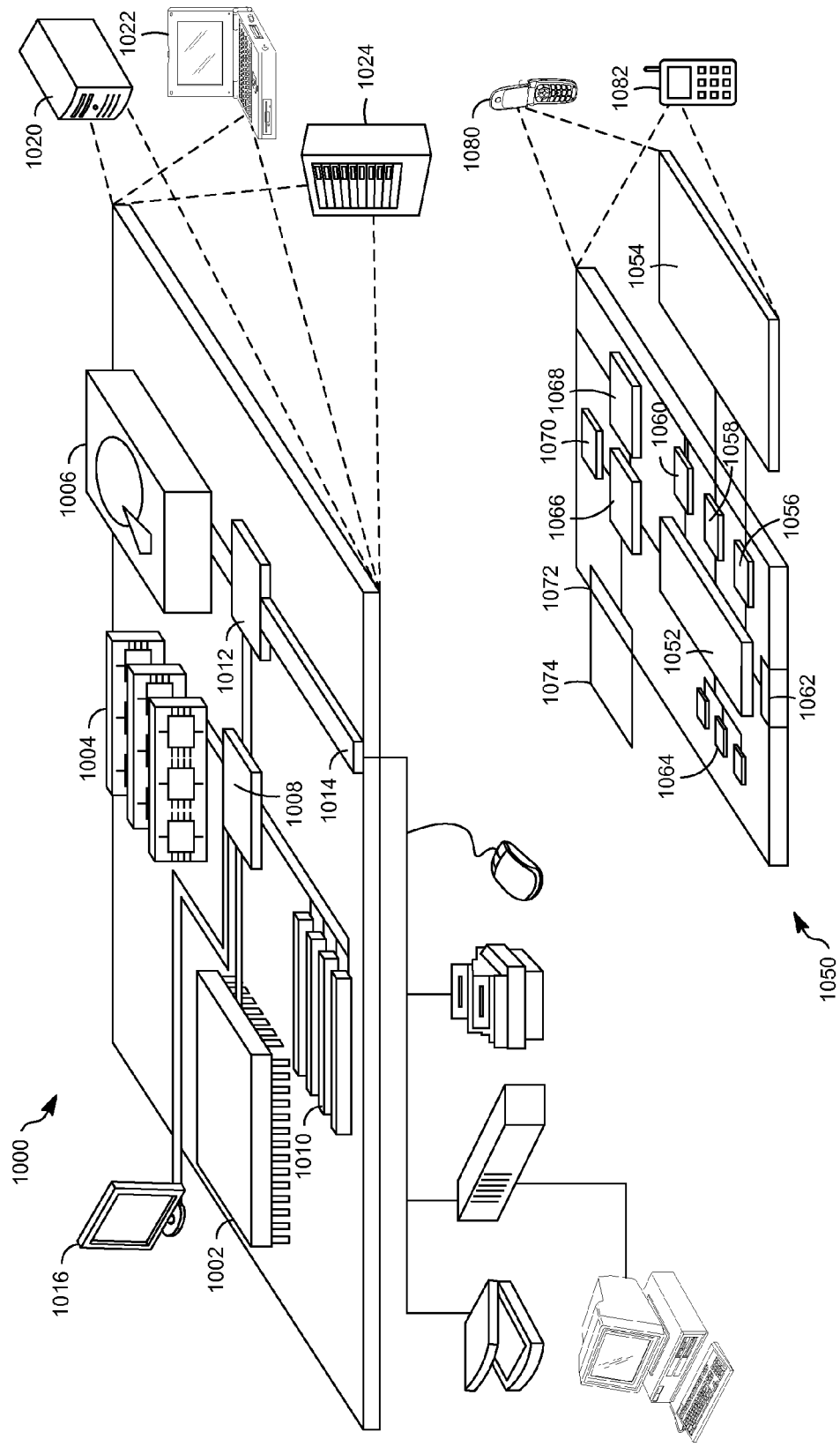
FIG. 10 is a diagram illustrating a computing device and a mobile computing device that can be used to implement the techniques described herein in accordance with an example embodiment.

FIG. 10 is a diagram that shows an example of a generic computer device 1000 and a generic mobile computer device 1050, which may be used with the techniques described here. Computing device 1000 is intended to represent various forms of digital computers, such as laptops, desktops, workstations, personal digital assistants, servers, blade servers, mainframes, and other appropriate computers. Computing device 1050 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 1000 includes a processor 1002, memory 1004, a storage device 1006, a high-speed interface 1008 connecting to memory 1004 and high-speed expansion ports 1010, and a low speed interface 1012 connecting to low speed bus 1014 and storage device 1006. Each of the components 1002, 1004, 1006, 1008, 1010, and 1012, are interconnected using various busses, and may be mounted on a common motherboard or in other manners as appropriate. The processor 1002 can process instructions for execution within the computing device 1000, including instructions stored in the memory 1004 or on the storage device 1006 to display graphical information for a GUI on an external input/output device, such as display 1016 coupled to high speed interface 1008. In other implementations, multiple processors and/or multiple buses may be used, as appropriate, along with multiple memories and types of memory. Also, multiple computing devices 1000 may be connected, with each device providing portions of the necessary operations (e.g., as a server bank, a group of blade servers, or a multi-processor system).

The memory 1004 stores information within the computing device 1000. In one implementation, the memory 1004 is a volatile memory unit or units. In another implementation, the memory 1004 is a non-volatile memory unit or units. The memory 1004 may also be another form of computer-readable medium, such as a magnetic or optical disk.

The storage device 1006 is capable of providing mass storage for the computing device 1000. In one implementation, the storage device 1006 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1004, the storage device 1006, or memory on processor 1002.

The high speed controller 1008 manages bandwidth-intensive operations for the computing device 1000, while the low speed controller 1012 manages lower bandwidth-intensive operations. Such allocation of functions is exemplary only. In one implementation, the high-speed controller 1008 is coupled to memory 1004, display 1016 (e.g., through a graphics processor or accelerator), and to high-speed expansion ports 1010, which may accept various expansion cards (not shown). In the implementation, low-speed controller 1012 is coupled to storage device 1006 and low-speed expansion port 1014. The low-speed expansion port, which may include various communication ports (e.g., USB, Bluetooth, Ethernet, wireless Ethernet) may be coupled to one or more input/ output devices, such as a keyboard, a pointing device, a scanner, or a networking device such as a switch or router, e.g., through a network adapter.

The computing device 1000 may be implemented in a number of different forms, as shown in the figure. For example, it may be implemented as a standard server 1020, or multiple times in a group of such servers. It may also be implemented as part of a rack server system 1024. In addition, it may be implemented in a personal computer such as a laptop computer 1022. Alternatively, components from computing device 1000 may be combined with other components in a mobile device (not shown), such as device 1050. Each of such devices may contain one or more of computing device 1000, 1050, and an entire system may be made up of multiple computing devices 1000, 1050 communicating with each other.

Computing device 1050 includes a processor 1052, memory 1064, an input/output device such as a display 1054, a communication interface 1066, and a transceiver 1068, among other components. The device 1050 may also be provided with a storage device, such as a microdrive or other device, to provide additional storage. Each of the components 1050, 752, 1064, 1054, 1066, and 1068, are interconnected using various buses, and several of the components may be mounted on a common motherboard or in other manners as appropriate.

The processor 1052 can execute instructions within the computing device 1050, including instructions stored in the memory 1064. The processor may be implemented as a chipset of chips that include separate and multiple analog and digital processors. The processor may provide, for example, for coordination of the other components of the device 1050, such as control of user interfaces, applications run by device 1050, and wireless communication by device 1050.

Processor 1052 may communicate with a user through control interface 1058 and display interface 1056 coupled to a display 1054. The display 1054 may be, for example, a TFT LCD (Thin-Film-Transistor Liquid Crystal Display) or an OLED (Organic Light Emitting Diode) display, or other appropriate display technology. The display interface 1056 may comprise appropriate circuitry for driving the display 1054 to present graphical and other information to a user. The control interface 1058 may receive commands from a user and convert them for submission to the processor 1052. In addition, an external interface 1062 may be provide in communication with processor 1052, so as to enable near area communication of device 1050 with other devices. External interface 1062 may provide, for example, for wired communication in some implementations, or for wireless communication in other implementations, and multiple interfaces may also be used.

The memory 1064 stores information within the computing device 1050. The memory 1064 can be implemented as one or more of a computer-readable medium or media, a volatile memory unit or units, or a non-volatile memory unit or units. Expansion memory 1074 may also be provided and connected to device 1050 through expansion interface 1072, which may include, for example, a SIMM (Single In Line Memory Module) card interface. Such expansion memory 1074 may provide extra storage space for device 1050, or may also store applications or other information for device 1050. Specifically, expansion memory 1074 may include instructions to carry out or supplement the processes described above, and may include secure information also. Thus, for example, expansion memory 1074 may be provide as a security module for device 1050, and may be programmed with instructions that permit secure use of device 1050. In addition, secure applications may be provided via the SIMM cards, along with additional information, such as placing identifying information on the SIMM card in a non-hackable manner.

The memory may include, for example, flash memory and/ or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1064, expansion memory 1074, or memory on processor 1052, which may be received, for example, over transceiver 1068 or external interface 1062.

Device 1050 may communicate wirelessly through communication interface 1066, which may include digital signal processing circuitry where necessary. Communication interface 1066 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1068. In addition, short-range communication may occur, such as using a Bluetooth, WiFi, or other such transceiver (not shown). In addition, GPS (Global Positioning System) receiver module 1070 may provide additional navigation- and location-related wireless data to device 1050, which may be used as appropriate by applications running on device 1050.

Device 1050 may also communicate audibly using audio codec 1060, which may receive spoken information from a user and convert it to usable digital information. Audio codec 1060 may likewise generate audible sound for a user, such as through a speaker, e.g., in a handset of device 1050. Such sound may include sound from voice telephone calls, may include recorded sound (e.g., voice messages, music files, etc.) and may also include sound generated by applications operating on device 1050.

The computing device 1050 may be implemented in a number of different forms, as shown in the figure. For example, it may be implemented as a cellular telephone 1080. It may also be implemented as part of a smart phone 1082, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal.

The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer-implemented method for installing a browser extension in a browser application, the method comprising:

receiving, in a main process of the browser application running on a computing system, a browser extension installation package for installation in the browser application, the browser extension installation package including a plurality of constituent files of the browser extension;

extracting a public key from the browser extension installation package; and validating a digital signature of the browser extension installation package using the public key, wherein:

if validation of the digital signature is unsuccessful, installation of the browser extension is canceled; and if validation of the digital signature is successful, the method comprises:

launching a sandboxed sub-process of the browser application;

in the sandboxed sub-process, transcoding or recoding at least one of the plurality of constituent files, the at least one transcoded or recoded file replacing a corresponding original constituent file of the plurality of constituent files in the browser extension installation package;

after the transcoding or recoding, passing the constituent files from the sandboxed sub-process to the main browser process; and in the main process of the browser application, installing the browser extension to the browser application using the at least one transcoded or recoded constituent file.

2. The computer-implemented method of claim 1, further comprising, prior to transcoding or recoding the at least one of the plurality of constituent files:

creating, by the main browser process, a temporary file directory for use by the sandboxed sub-process; and copying the browser extension installation package to the temporary file directory.

3. The computer-implemented method of claim 1, wherein the sandboxed sub-process and the main process of the browser application communicate via an inter-process communication (IPC) layer.

4. The computer-implemented method of claim 1, wherein the sandboxed sub-process is restricted to accessing only resources of the computing system allocated to the sandboxed sub-process by the main browser process.

5. The computer-implemented method of claim 1, wherein the browser extension installation package comprises an archived file including the plurality of constituent files of the browser extension, the method further comprising:

unpacking, by the sandboxed sub-process, the archived file into the plurality of constituent files of the browser extension; and determining whether unpacking of the archived file completed successfully, wherein:

if unpacking of the archived file completed successfully, installation of the browser extension continues; and if unpacking of the archived file did not complete successfully, installation of the browser extension is canceled.

6. The computer-implemented method of claim 5, further comprising, subsequent to unpacking the archived file, at least one of:

validating a header of the browser extension installation package; and verifying a digital signature of the unpacked browser extension installation package.

7. The computer-implemented method of claim 1, wherein the transcoding or recoding the at least one of the plurality of constituent files includes:

decoding an image file of the browser extension installation package using an image encoder/decoder included in the browser application; and re-encoding the image file to a bitmap format using the image encoder/decoder included in the browser application.

8. The computer-implemented method of claim 7, wherein:

if decoding the image file completes successfully, installation of the browser extension continues; and if decoding the image file is unsuccessful, installation of the browser extension is canceled.

9. The computer-implemented method of claim 1, wherein the transcoding or recoding the at least one of the plurality of constituent files includes:

parsing one or more JSON objects using a JSON parser included in the browser application; and serializing the one or more parsed JSON objects for communication over an inter-process communication layer.

10. The computer-implemented method of claim 9, wherein:
if parsing of the one or more JSON objects is successful, installation of the browser extension continues; and
if parsing of the one or more JSON objects is unsuccessful, installation of the browser extension is canceled.

11. The computer-implemented method of claim 9, wherein the one or more JSON objects comprises at least one of:
a manifest file, the manifest file comprising a plurality of fields containing defining information for the browser extension; and
a catalog file, the catalog file including a plurality of key-value pairs, the key-value pairs being configured to provide for internationalization of the browser extension.

12. The computer-implemented method of claim 1, wherein the at least one transcoded or recoded constituent file is passed from the sandboxed sub-process to the main browser process via an inter-process communication layer.

13. A computer-implemented method for installing a browser extension in a browser application, the method comprising:
receiving, in a main process of the browser application running on a computing system, a browser extension installation package for installation in the browser application, the browser extension installation package including a header and a plurality of constituent files of the browser extension;
placing the browser extension installation package in a temporary directory;
launching a sandboxed sub-process of the browser application, the sandboxed sub-process having access to the temporary directory;
in the sandboxed sub-process:
performing at least one of:
validating the header of the browser extension installation package; and
verifying a digital signature of the browser extension installation package; and
transcoding or recoding at least one file of the plurality of constituent files, the transcoded or recoded file replacing a corresponding original constituent file of the plurality of constituent files;
after the transcoding or recoding, passing the constituent files from the sandboxed sub-process to the main browser process; and
in the main process of the browser application, installing the browser extension to the browser application using the at least one transcoded or recoded constituent file.

14. The computer-implemented method of claim 13, wherein:
if validation of the header completes properly, installation of the browser extension continues; and
if validation of the header does not complete properly, installation of the browser extension is canceled.

15. The computer-implemented method of claim 13, wherein:
if verification of the digital signature is successful, installation of the browser extension continues; and
if verification of the digital signature is unsuccessful, installation of the browser extension is canceled.

16. The computer-implemented method of claim 13, wherein validating the header comprises one or more of:

verifying that a size of the header matches an expected header size;
verifying that the header includes a properly located browser extension installation package identifying code;
verifying that the header includes a properly formed and properly located version field;
verifying that a size of a public key included in the browser extension installation package matches an expected public key size;
verifying that a size of a digital signature of the browser extension installation package matches an expected digital signature size; and
verifying that a format of the public key matches an expected public key format.

17. The computer-implemented method of claim 13, wherein verifying the digital signature comprises:
extracting a public key from the browser extension installation package;
decrypting the digital signature using the public key;
generating a message digest of the unpacked browser extension installation package; and
comparing the generated message digest with the decrypted digital signature.

18. An apparatus comprising:
a processor; and
a non-transitory recordable storage medium having instructions for installing a browser extension in a browser application, wherein, the apparatus is configured, as a result of executing the instructions, to:
receive, in a main process of the browser application running on a computing system, a browser extension installation package for installation in the browser application, the browser extension installation package including a plurality of constituent files of the browser extension;
extract a public key from the browser extension installation package; and
validate a digital signature of the browser extension installation package using the public key,
wherein:
if validation of the digital signature is unsuccessful, installation of the browser extension is canceled; and
if validation of the digital signature is successful, the apparatus is configured, as result of executing the instructions, to:
launch a sandboxed sub-process of the browser application;
in the sandboxed sub-process, transcode or recode at least one file of the plurality of constituent files, the at least one transcoded or recoded file replacing a corresponding original constituent file of the plurality of constituent files in the browser extension installation package;
after the transcoding or recoding, pass the constituent files from the sandboxed sub-process to the main browser process; and
in the main process of the browser application, install the browser extension to the browser application using the at least one transcoded or recoded constituent file.

19. An apparatus comprising:
a processor; and
a non-transitory recordable storage medium having instructions for installing a browser extension in a browser application, wherein, the apparatus is configured, as a result of executing the instructions, to:

receive, in a main process of the browser application running on a computing system, a browser extension installation package for installation in the browser application, the browser extension installation package including a header and a plurality of constituent files of the browser extension;

place the browser extension installation package in a temporary directory;

launch a sandboxed sub-process of the browser application, the sandboxed sub-process having access to the temporary directory;

in the sandboxed sub-process:
  perform at least one of:
    validate the header of the browser extension installation package; and
    verify a digital signature of the browser extension installation package; and
  transcode or recode at least one file of the plurality of constituent files, the at least one transcoded or recoded file replacing a corresponding original constituent file of the plurality of constituent files;

after the transcoding or recoding, pass the constituent files from the sandboxed sub-process to the main browser process; and in the main process of the browser application, install the browser extension to the browser application using the at least one transcoded or recoded constituent file.

* * * * *